United States Patent
Bard et al.

(10) Patent No.: US 12,117,405 B2
(45) Date of Patent: Oct. 15, 2024

(54) METHOD AND SYSTEM FOR PROVIDING OPTICAL DISTORTION INFORMATION OF A VEHICLE GLAZING

(71) Applicant: ACR II GLASS AMERICA INC., Nashville, TN (US)

(72) Inventors: Michael Bard, Primm Springs, TN (US); Markus Walter Pohlen, Mückeln (DE); Donald Philip Michelotti, Nashville, TN (US); Yu Matsuda, Nashville, TN (US); Linda Anne Leonard, Bloomfield Hills, MI (US)

(73) Assignee: ACR II GLASS AMERICA INC., Nashville, TN (US)

( * ) Notice: Subject to any disclaimer, the term of this patent is extended or adjusted under 35 U.S.C. 154(b) by 363 days.

(21) Appl. No.: 17/641,635

(22) PCT Filed: Sep. 11, 2020

(86) PCT No.: PCT/US2020/050417
§ 371 (c)(1),
(2) Date: Mar. 9, 2022

(87) PCT Pub. No.: WO2021/050882
PCT Pub. Date: Mar. 18, 2021

(65) Prior Publication Data
US 2022/0349837 A1 Nov. 3, 2022

Related U.S. Application Data

(60) Provisional application No. 62/900,095, filed on Sep. 13, 2019, provisional application No. 62/900,119, filed on Sep. 13, 2019.

(51) Int. Cl.
*G01N 21/958* (2006.01)
*B60R 11/00* (2006.01)
(Continued)

(52) U.S. Cl.
CPC ............ *G01N 21/958* (2013.01); *B60R 11/00* (2013.01); *G01N 21/8851* (2013.01);
(Continued)

(58) Field of Classification Search
CPC .. G01N 21/958; G01N 21/8851; G01N 21/93; G01N 2021/9586; B60R 11/00; B60R 2011/0026
(Continued)

(56) References Cited

U.S. PATENT DOCUMENTS 5,343,288 A * 8/1994 Cohen .................. G01N 21/958
359/13
8,957,963 B2 2/2015 Almeida et al.
(Continued)

FOREIGN PATENT DOCUMENTS

EP 0932826 B1 10/1997
EP 3293701 B1 9/2016
(Continued)

OTHER PUBLICATIONS

International Search Report and Written Opinion of the International Searching Authority for International Application No. PCT/US20/50417, filed Sep. 11, 2020, mailed on Dec. 10, 2020, by the United States Patent and Trademark Office, 10 pages.
(Continued)

*Primary Examiner* — Allen C Wong
(74) *Attorney, Agent, or Firm* — K&L Gates LLP; Shu Chen

(57) ABSTRACT

Systems and methods for providing optical distortion information of a vehicle glazing are disclosed. In one example, a method comprises obtaining and analyzing, via at least one processor of a computing device, optical characteristics of the vehicle glazing; generating digitized optical distortion information for the vehicle glazing based on analysis results;
(Continued)

generating identification information for the vehicle glazing; and associating the digitized optical distortion information with the identification information.

14 Claims, 10 Drawing Sheets

(51) Int. Cl.
  *G01N 21/88*   (2006.01)
  *G01N 21/93*   (2006.01)
(52) U.S. Cl.
  CPC ...... *G01N 21/93* (2013.01); *B60R 2011/0026* (2013.01); *G01N 2021/9586* (2013.01)
(58) Field of Classification Search
  USPC .......................................................... 348/61
  See application file for complete search history.

(56) References Cited

U.S. PATENT DOCUMENTS

| | | | |
|---|---|---|---|
| 10,196,005 | B2 | 2/2019 | Eytan et al. |
| 10,810,712 | B2 | 10/2020 | Terada et al. |
| 2010/0086191 | A1 | 4/2010 | Freeman et al. |
| 2012/0206601 | A1 | 8/2012 | Seger et al. |
| 2015/0223012 | A1 | 8/2015 | Kakarala et al. |
| 2016/0353083 | A1 | 12/2016 | Aoki et al. |
| 2016/0368417 | A1 | 12/2016 | Bassi et al. |
| 2017/0190151 | A1 | 7/2017 | Hamano et al. |
| 2021/0268776 | A1* | 9/2021 | Thangamani ......... B60W 50/14 |
| 2022/0127187 | A1* | 4/2022 | Dreux ..................... C03C 17/34 |

FOREIGN PATENT DOCUMENTS

| | | |
|---|---|---|
| EP | 3505865 A1 | 7/2017 |
| JP | 2007-034611 A | 2/2007 |
| JP | 2017062198 A | 3/2017 |

OTHER PUBLICATIONS

Bauer, et al. "Computational optical distortion correction using a radial basis function-based mapping method." Optics Express, vol. 20, No. 14, pp. 14906-14920. Jul. 2, 2012.

* cited by examiner

METHOD AND SYSTEM FOR PROVIDING OPTICAL DISTORTION INFORMATION OF A VEHICLE GLAZING

CROSS REFERENCE TO RELATED APPLICATIONS

This application is a national phase application of PCT International Patent Application No. PCT/US2020/050417, filed on Sep. 11, 2020, which claims priority to U.S. Provisional Patent Application Nos. 62/900,095 and 62/900,119, both filed on Sep. 13, 2019, and entitled "METHOD AND SYSTEM FOR PROVIDING OPTICAL DISTORTION INFORMATION OF A VEHICLE GLAZING," the content of each is incorporated by reference herein in its entirety.

TECHNICAL FIELDS

The present disclosure generally relates to methods and systems for providing optical distortion information of a glass product such as a vehicle glazing. In one aspect, the present disclosure relates to determining and selecting a suitable or compatible information acquisition system for a vehicle based at least on the optical quality information of a vehicle glazing. In another aspect, the present disclosure relates to correcting image distortion obtained by an information acquisition system through a vehicle glazing.

BACKGROUND

Information acquisition systems mounted within a vehicle are increasingly popular for improving safety performance and/or comfort, e.g., advanced driver assistance system (ADAS) or an auto-driving mode of a vehicle. This type of system may include imaging systems, anti-collision systems, brake assisting systems, driving assistance systems, and/or auto-driving systems using various electric sensors and/or cameras.

Electronic sensors or cameras associated with information acquisition systems may be mounted directly on an inner surface of a vehicle glazing or positioned near a vehicle glazing. The sensors or cameras may collect information on conditions outside of a vehicle by, for example, emitting and/or detecting visible light, infrared rays, near infrared rays, and/or laser radar through a vehicle glazing, which may be laminated or a single glass substrate. For example, U.S. Pat. No. 10,196,005 B2 generally discloses a camera system for ADAS.

To prevent the electronic sensors or cameras from being seen from outside of a vehicle, an opaque enamel layer (e.g., dark or black colored enamel printing) may be printed on an inner surface S2 of an outer glass (first glass) substrate and/or on an outer surface S4 of an inner glass (second glass) substrate, of a laminated vehicle glazing including a front and rear windshield. The opaque enamel print may be applied to mask such an information acquisition system and provide an opaque enamel print open area (camera opening) through which the information acquisition system collects information, in addition to an opaque enamel print region in the periphery of the laminated vehicle glazing. When a vehicle glazing comprises a single pane (such as a tempered rear windshield), the opaque enamel layer may be printed on an outer surface S1 and/or an inner surface S2 of the tempered single pane glazing, with the opaque enamel print open area.

Optical distortion may be inevitably present in a vehicle glazing, typically originating from its manufacturing processes (such as a float process for preparing a flat glass substrate, a firing process of an opaque enamel print and/or a bending process to obtain a curved glass substrate). Such optical distortions in the vehicle glazing may be observed along the opaque enamel print including the open area, resulting in distortion of information (e.g., image) acquired by the information acquisition system.

An imaging processor in the information acquisition system may have a calibration or correction system for distorted images obtained through the vehicle glazing. For example, U. S. Patent Application Publication No. 2012/0206601 generally discloses obtaining images with reduced distortion using an image correction device. Such an image distortion correction system may be based on the assumption that each vehicle glazing has the same or highly similar optical distortion distribution. However, each vehicle glazing may have a different pattern of optical distortion distribution, even where the vehicle glazings are prepared using the same processes.

Furthermore, a vehicle glazing having reduced optical distortion is required to minimize error sources of the optical sensing systems. U.S. Patent Application Publication No. 2017/0190151 generally discloses a vehicle windshield having a smoother surface obtained by an additional glass polishing step. However, an additional polishing process may increase production time and cost of a vehicle glazing. Moreover, since recent progress of image resolution in the information acquisition system requires further reduced optical distortion in the vehicle glazing, it may be difficult to meet the requirement of the optical distortion level for high resolution or advanced function information acquiring system.

Accordingly, there is a need to obtain optical quality information of a vehicle glazing and accordingly select the most suitable and compatible information acquisition system such that optical distortions caused by the vehicle glazing can be reduced. Further, there is a need, especially in semi or autonomous vehicles, to obtain reduced distorted information (images) for each windshield and properly calibrate information acquisition system, for example, in vehicles using autonomous driving technology that makes extensive use of optical sensors and relies on good image quality.

SUMMARY

Among other features, the present disclosure relates to providing optical distortion information of a vehicle glazing. One example method comprises obtaining and analyzing, via at least one processor of an optical distortion determination system, optical characteristics of the vehicle glazing, generating digitized optical distortion information for the vehicle glazing based on analysis results, generating identification information for the vehicle glazing, and associating the digitized optical distortion information with the identification information. The digitized optical distortion information and the identification information may be transmitted to at least one computing system via a communication network. In one embodiment, the at least one computing system may be a cloud-based computing server system configured to store the digitized optical distortion information and the identification information.

The digitized optical distortion information for the vehicle glazing may comprise data related to the optical characteristics of the vehicle glazing, a warpage map of the vehicle glazing, or data related to a modulation transfer function (MTF) of the vehicle glazing. The identification information of the vehicle glazing may comprise at least one unique machine-readable code including at least one of a combination of numbers and/or letters, barcode, quick response (QR) code, passive or active radio frequency identification (RFID) tag, near field communication (NFC) tracker, Bluetooth low energy (BLE) beacon, and global system for mobile communication/short message service (GSM/SMS) tag.

In one embodiment, the digitized optical distortion information of the vehicle glazing may be downloaded from the cloud-based computing server system in connection with the identification information and used to determine and select a suitable or compatible information acquisition system to be mounted near the vehicle glazing and acquire information through the vehicle glazing. In another embodiment, the method may further comprise calibrating, by another computing device, an information acquisition system mounted near the vehicle glazing and acquire information through the vehicle glazing based at least upon the digitized optical distortion information.

The present disclosure also discloses a system for providing optical distortion information of a vehicle glazing. An example system may comprise at least one processor configured to: obtain and analyze optical characteristics of the vehicle glazing; generate digitized optical distortion information for the vehicle glazing based on analysis results; generate identification information for the vehicle glazing; and associate the digitized optical distortion information with the identification information. In one embodiment, the at least one processor may be configured to transmit the digitized optical distortion information and the identification information to at least one computing system via a communication network. The digitized optical distortion information for the vehicle glazing may comprise at least data related to the optical characteristics of the vehicle glazing, a warpage map of the vehicle glazing, or data related to a MTF of the vehicle glazing. The identification information of the vehicle glazing may comprise at least one unique machine-readable code including at least one of a combination of numbers and/or letters, barcode, QR code, passive or active RFID tag, NFC tracker, BLE beacon, and GSM/SMS tag.

In one embodiment, the at least one computing system may be a cloud-based computing server system configured to store the digitized optical distortion information and the identification information. The digitized optical distortion information of the vehicle glazing may be downloaded from the cloud-based computing server system using the identification information. The digitized optical distortion information may be used for determining and selecting an information acquisition system to be mounted near the vehicle glazing, wherein the information acquisition system is configured to acquire information through the vehicle glazing. In another embodiment. the digitized optical distortion information may be used to calibrate an information acquisition system mounted near the vehicle glazing and acquire information through the vehicle glazing.

The present disclosure further discloses a non-transitory computer-readable medium comprising code that, when executed by a processor of a computing device, causes the processor to perform: obtaining and analyzing optical characteristics of the vehicle glazing; generating digitized optical distortion information for the vehicle glazing based on analysis results; generating identification information for the vehicle glazing; and associating the digitized optical distortion information with the identification information.

In one embodiment, the non-transitory computer-readable medium may comprise code for causing the processor to perform transmitting the digitized optical distortion information and the identification information to at least one computing system via a communication network. The digitized optical distortion information for the vehicle glazing comprises at least data related to the optical characteristics of the vehicle glazing, a warpage map of the vehicle glazing, or data related to a MTF of vehicle glazing. The identification information of the vehicle glazing may comprise at least one unique machine-readable code including at least one of a combination of numbers and/or letters, barcode, QR code, passive or active RFID tag, NFC tracker, BLE beacon, and GSM/SMS tag.

In one embodiment, the at least one computing system may be a cloud-based computing server system configured to store the digitized optical distortion information and the identification information, such that another computing device may download the digitized optical distortion information of the vehicle glazing from the cloud-based computing server system using the identifying information.

In another embodiment, the non-transitory computer-readable medium may comprise code for selecting, by another computing device, an information acquisition system to be mounted near the vehicle glazing and acquire information through the vehicle glazing based at least upon the digitized optical distortion information. In yet another embodiment, the non-transitory computer-readable medium may comprise code for calibrating, by another computing device, an information acquisition system mounted near the vehicle glazing and acquire information through the vehicle glazing based at least upon the digitized optical distortion information.

Moreover, the present disclosure discloses a method for providing optical distortion information of a vehicle glazing. The method may comprise obtaining and analyzing, by a first computing device, optical characteristics of the vehicle glazing; generating, by the first computing device, digitized optical distortion information for the vehicle glazing based on analysis results; generating, by the first computing device, identification information for the vehicle glazing; associating, by the first computing device, the digitized optical distortion information with the identification information. The method may further comprise transmitting, by the first computing device, the digitized optical distortion information and the identification information to a second computing device via a communication network; storing, by the second computing device, the digitized optical distortion information and the identification information; downloading, by a third computing device, the digitized optical distortion information from the second computing device, using the identification information; and determining and selecting, by the third computing device, based at least on the digitized optical distortion information, an information acquisition system to be mounted near the vehicle glazing and acquire information through the vehicle glazing.

In addition, the present disclosure discloses a system for providing optical distortion information of a vehicle glazing. The system may comprise an optical distortion determination system comprising at least one processor configured to: obtain and analyze optical characteristics of the vehicle glazing, generate digitized optical distortion information for the vehicle glazing based on analysis results, generate identification information for the vehicle glazing, associate the digitized optical distortion information with the identification information, and transmit the digitized optical distortion information and the identification information to at least one computing system via a communication network. The at least one computing system may be configured to store the digitized optical distortion information and the identification information. The system may comprise a computing device configured to: download the digitized optical distortion information from the at least one computing system using the identification information, and determine and select, based at least on the digitized optical distortion information, an information acquisition system to be mounted near the vehicle glazing and acquire information through the vehicle glazing.

In another embodiment, the present disclosure discloses a method for providing optical distortion information of a vehicle glazing. The method may comprise obtaining and analyzing, by a first computing device, optical characteristics of the vehicle glazing; generating, by the first computing device, digitized optical distortion information for the vehicle glazing based on analysis results; generating, by the first computing device, identification information for the vehicle glazing; associating, by the first computing device, the digitized optical distortion information with the identification information. The method may further comprise transmitting, by the first computing device, the digitized optical distortion information and the identification information to a second computing device via a communication network; storing, by the second computing device, the digitized optical distortion information and the identification information; mounting an information acquisition system near the vehicle glazing for acquiring information through the vehicle glazing; downloading, by a third computing device, the digitized optical distortion information from the second computing device, using the identification information; and calibrating, by the third computing device, the information acquisition system based at least on the digitized optical distortion information.

In another embodiment, the present disclosure discloses a system for providing optical distortion information of a vehicle glazing. The system may comprise an optical distortion determination system comprising at least one processor configured to: obtain and analyze optical characteristics of the vehicle glazing, generate digitized optical distortion information for the vehicle glazing based on analysis results, generate identification information for the vehicle glazing, associate the digitized optical distortion information with the identification information, and transmit the digitized optical distortion information and the identification information to at least one computing system via a communication network. The at least one computing system may be configured to store the digitized optical distortion information and the identification information. An information acquisition system may be mounted near the vehicle glazing to acquire information through the vehicle glazing. A computing device of the system may be configured to download the digitized optical distortion information from the at least one computing system using the identification information, and calibrate the information acquisition system based at least on the digitized optical distortion information.

In yet another embodiment, the present disclosure discloses a method for calibrating an information acquisition system. The method may comprise: mounting an information acquisition system near a vehicle glazing for acquiring information through the vehicle glazing; downloading, by a first computing device, digitized optical distortion information for the vehicle glazing from a second computing device via a communication network, using identification information of the vehicle glazing; and calibrating, by the first computing device, the information acquisition system based at least on the digitized optical distortion information. The identification information of the vehicle glazing may include at least one unique machine-readable code that is associated with the digitized optical distortion information.

Additionally, the present disclosure discloses a system for calibrating an information acquisition system. The system may comprise an information acquisition system mounted near a vehicle glazing to acquire information through the vehicle glazing, and a computing device configured to: download digitized optical distortion information of the vehicle glazing from at least one computing system via a communication network using identification information of the vehicle glazing, and calibrate the information acquisition system based at least on the digitized optical distortion information. The identification information of the vehicle glazing may include at least one unique machine-readable code that is associated with the digitized optical distortion information.

Moreover, the present disclosure provides a method for determining and selecting an information acquisition system. The method comprises obtaining, by a computing device, identification information that uniquely identifies a vehicle glazing; receiving, by the computing device, digitized optical distortion information of the vehicle glazing using the identification information; and determining and selecting, by the computing device, based at least on the digitized optical distortion information, an information acquisition system to be mounted near the vehicle glazing and acquire information through the vehicle glazing.

The identification information of the vehicle glazing may comprise at least one unique machine-readable code including at least one of a combination of numbers and/or letters, barcode, QR code, passive or active RFID tag, NFC tracker, BLE beacon, and GSM/SMS tag. In one embodiment, receiving the digitized optical distortion information comprises downloading, by the computing device, the digitized optical distortion information of the vehicle glazing from another computing device via a communication network, using the identification information of the vehicle glazing.

Further, the present disclosure provides a system for determining and selecting an information acquisition system. The system may comprise a computing device including a processor configured to: obtain identification information that uniquely identifies a vehicle glazing; receive digitized optical distortion information of the vehicle glazing using the identification information; and determine and select, based at least on the digitized optical distortion information, an information acquisition system to be mounted near the vehicle glazing and acquire information through the vehicle glazing. The identification information of the vehicle glazing may comprise at least one unique machine-readable code including at least one of a combination of numbers and/or letters, barcode, QR code, passive or active RFID tag, NFC tracker, BLE beacon, and GSM/SMS tag. In one embodiment, the computer device may be configured to download the digitized optical distortion information of the vehicle glazing from another computing device via a communication network, using the identification information of the vehicle glazing.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

In the following description, for purposes of explanation, specific details are set forth to promote a thorough understanding of one or more aspects of the disclosure. It may be evident in some or all instances that many aspects described below can be practiced without adopting the specific design details described below.

Figure 1:
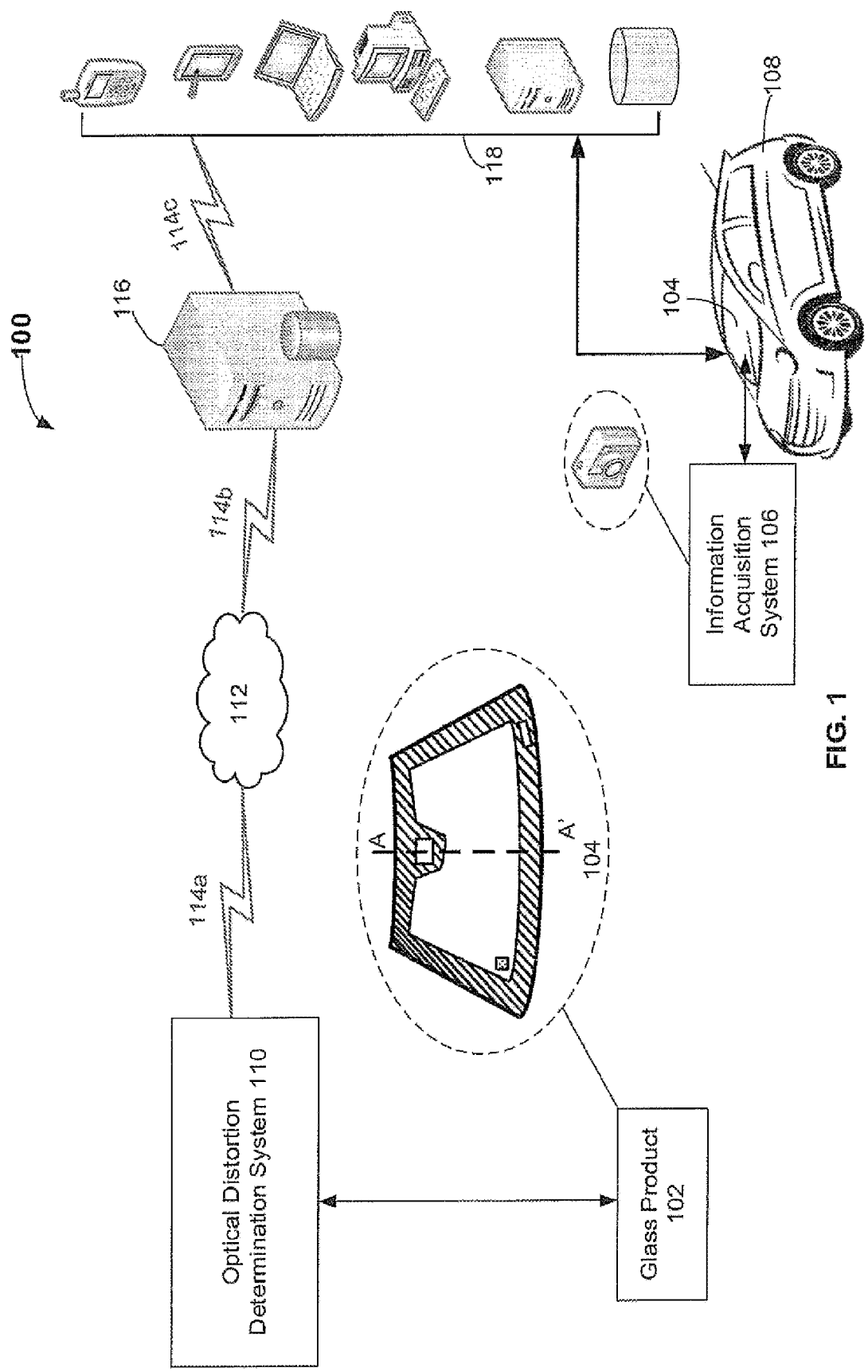
FIG. 1 illustrates a schematic diagram of a system for providing optical distortion information related to a glass product such as a laminated vehicle glazing, according to an exemplary aspect of the present disclosure.

FIG. 1 shows a schematic diagram of a system 100 for providing optical distortion information related to a glass product 102, in accordance with aspects of the present disclosure. Glass product 102 may generally include various types of glass substrates or films (e.g., annealed glass, heat treated glass, thermally tempered glass, and chemically tempered glass) for automotive, residential, commercial, and architectural uses. Glass product 102 may have any applicable construction such as monolithic glass, laminated glass, insulated glass, or wired, textured, or patterned glass construction.

When applied in an automotive context, system 100 may be used to provide optical quality information of a vehicle glazing 104, such that information (e.g., images) acquired by a vehicle information acquisition system 106 may be corrected for distortions caused by the vehicle glazing 104. Vehicle information acquisition system 106 may comprise various electronic sensors and/or cameras mounted within a vehicle 108 near the vehicle glazing 104 and configured to monitor and detect a number of vehicle parameters and capture images of targets outside vehicle 108 through the vehicle glazing 104. Example vehicle information acquisition system sensors/cameras may comprise but not limited to mono and stereo cameras, rear cameras, ultra sound, lidar, radar, infrared, passive infrared, thermal. Time of Flight (TOF), speed sensors, ambient light sensors, ultrasonic sensors, automotive micro electro-mechanical systems (MEMS) sensors, and global positioning systems (GPS). These sensors and cameras may be used in ADAS, such as Lane Departure Warning (LDW), Forward Collision Alert (FCA), and Traffic Sign Monitoring (TSM) sensory systems. Other vehicle information acquisition sensory systems, such as sensors for telematics and infotainment, may be additionally included. These vehicle information acquisition system sensors and cameras 106 may be positioned in various locations of vehicle 108.

Figure 2:
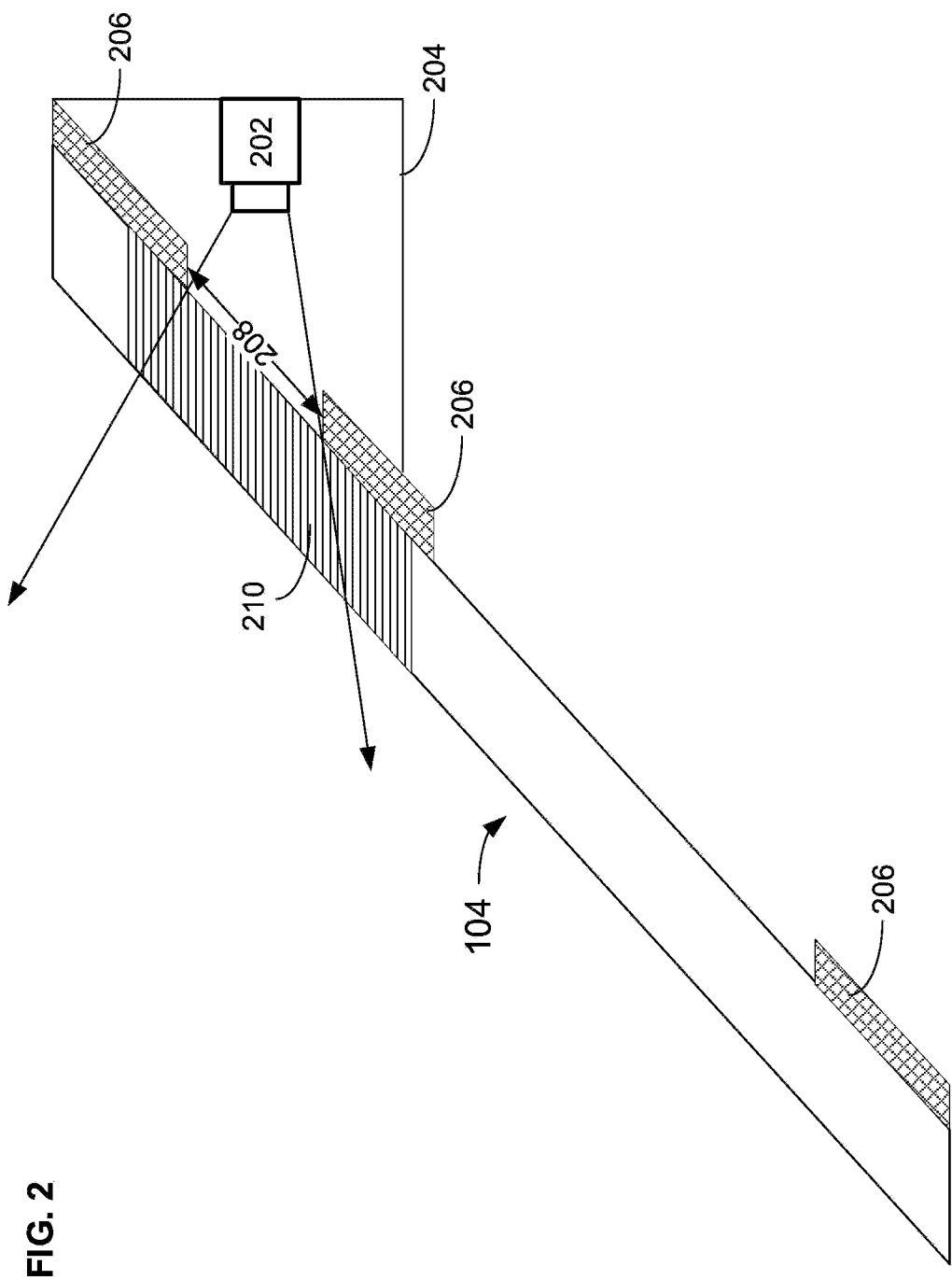
FIG. 2 illustrates a cross-sectional view of the laminated vehicle glazing of FIG. 1 taken along line AA', according to an exemplary aspect of the present disclosure.

FIG. 2 shows a cross-sectional view of the laminated vehicle glazing 104 of FIG. 1 equipped with vehicle information acquisition system 106 (e.g., a high-resolution camera or stereo cameras 202) taken along line AA'. In this example, camera 202 may be positioned in a bracket 204 near a vehicle's rear view mirror and masked by an opaque enamel layer 206 printed on an inner surface of vehicle glazing 104 which may be a front vehicle windshield. An open area 208 (e.g., open space without opaque enamel printing) may be implemented in the opaque enamel printing 206 through which camera 202 may detect conditions outside vehicle 108. Optical distortions 210 in the glass substrate(s) of vehicle glazing 104 may be observed along the opaque enamel print 206 and/or in the open area 208, resulting in distortion of information (image distortion) acquired by the information acquisition system 106/202.

Figure 10:
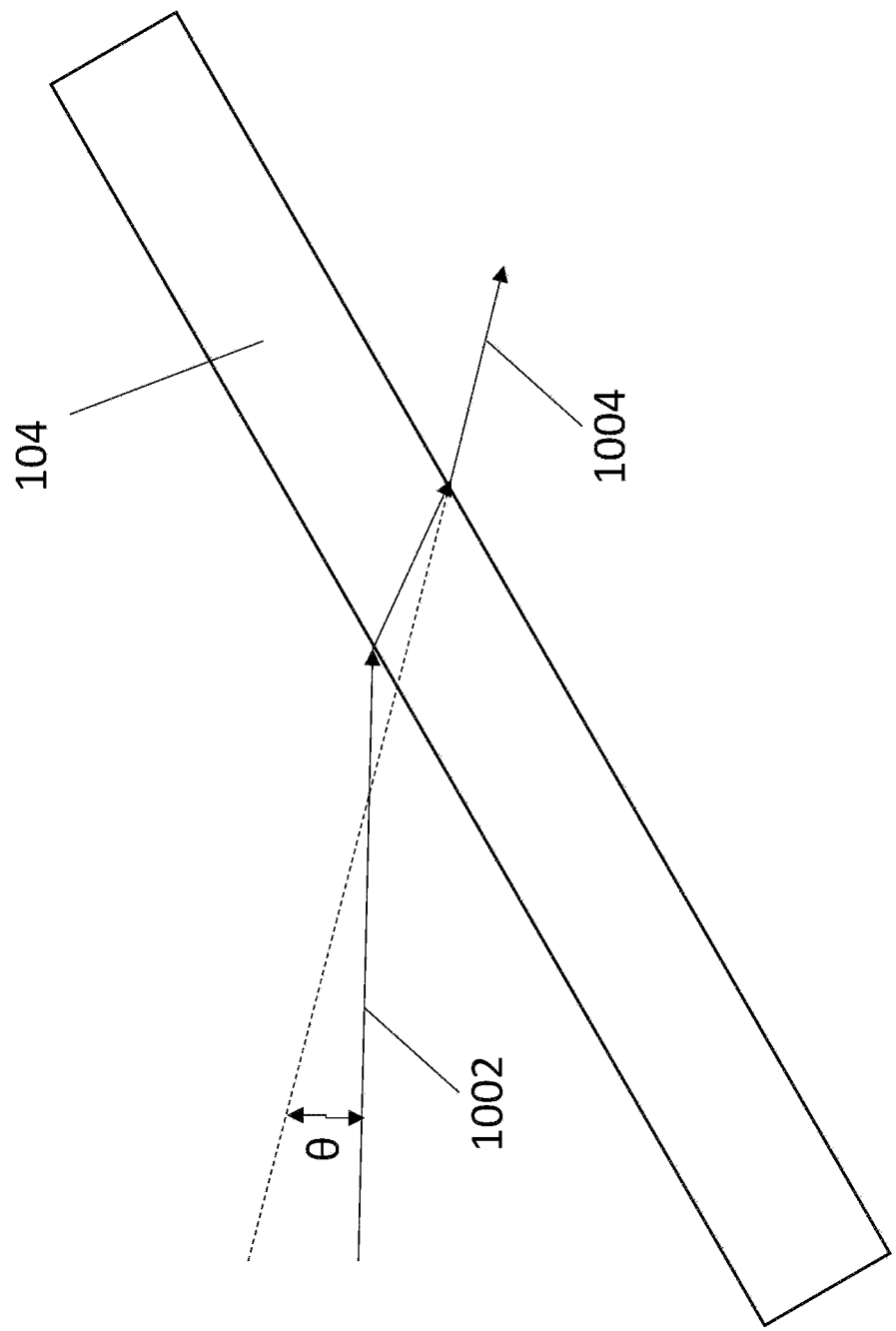
FIG. 10 illustrates a light beam path through a vehicle glazing.

Optical distortions may occur when a light beam from one point of an object passing through vehicle glazing 104 which refracts the light beam path to create an angular deviation. The angular deviation is a difference between an angle of an incident ray and an angle of an emergent ray. FIG. 10 shows the light beam path having incident ray 1002 entering the glazing 104 and exiting the glazing 104 at the emergent ray 1004. The angle theta (θ) between the emergent ray 1004 and the incident ray 1002 is the angle of deviation. Change in the angular deviation may relate to the optical power or refractive power of vehicle glazing 104. Angular deviation and refractive power may serve as a measure of the optical distortion of vehicle glazing 104.

To correct for optical distortions 210 or to select a suitable information acquisition system 106 affected by optical distortions 210, an optical distortion determination system 110 may be configured to obtain and analyze optical characteristics of each vehicle glazing 104, generate digitized optical distortion information for each vehicle glazing 104 based on the analysis results, generate identification information to uniquely identify each vehicle glazing 104, and associate the digitized optical distortion information with the identification information. The digitized optical distortion information and the identification information may be transmitted to at least one computing device (e.g., computing server system 116 of FIG. 1) via communication network 112 for storage and/or further analysis. This digitized optical distortion information of each vehicle glazing 104 may be accessed and downloaded from anywhere and anytime by another computing system or device 118 deployed with the same or different communication network. In one embodiment, when the laminated vehicle glazing 104 (e.g., windshield) is assembled into a vehicle body together with an optical sensor (e.g., a digital camera 202), the identification information 316 of vehicle glazing 104 shown in FIG. 3 may be scanned by a calibration device (e.g., one of computing systems or devices 118) in order to retrieve the digitized optical distortion information of vehicle glazing 104 from computing server system 116 for calibrating various optical sensor and correcting distortions caused by vehicle glazing 104. In another embodiment, the identification information 316 may be scanned (e.g., by one of computing systems or devices 118) for retrieving the digitized optical distortion information of vehicle glazing 104 from computing server system 116 for determining and selecting a compatible and suitable camera system to be installed in the vehicle 108.

It is to be appreciated that system 100 may include any suitable and/or necessary interface components (not shown), which provide various adapters, connectors, channels, communication paths, to facilitate exchanging signals and data between various hardware and software components of the optical distortion determination system 110 and computing systems and devices 116, 118, and any applications, peer devices, remote or local server systems/service providers, additional database system(s), and/or with one another that are available on or connected via applicable communication networks and associated communication channels and protocols. A communication network (e.g., communication network 112) may refer to a geographically distributed collection of computing devices or data points interconnected by communication links and segments for transporting signals and data therebetween. A protocol (e.g., protocols 114a, 114b, and 114c) may refer to a set of rules defining how computing devices and networks may interact with each other, such as frame relay, internet protocol (IP), transmission control protocol (TCP), user datagram protocol (UDP), hypertext transfer protocol (HTTP). Many types of communication networks are available, ranging from local area networks (LANs), wide area networks (WANs), cellular networks, to overlay networks and software-defined networks (SDNs), a packet data network (e.g., the Internet), mobile telephone networks (e.g., cellular networks, such as 4G or 5G), Plain Old Telephone (POTS) networks, and wireless data networks (e.g., Institute of Electrical and Electronics Engineers (IEEE) 802.11 family of standards known as Wi-Fi®, WiGig®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, virtual private networks (VPN). Bluetooth, Near Field Communication (NFC), or any other suitable network.

For example, system 100 may employ a cloud-based communication network 112 for providing computing services using shared resources. Cloud computing may be Internet-based with computing resources that are dynamically provisioned and allocated to each connected computing device or other devices on-demand, from a collection of resources available via the network or the cloud. Cloud computing resources may include any type of resource, such as computing, storage, and networking. For instance, cloud computing resources may include service devices (firewalls, deep packet inspectors, traffic monitors, load balancers, etc.), compute/processing devices (servers, central processing units (CPUs), graphics processing units (GPUs), random access memory, caches, etc.), and storage devices (e.g., network attached storages, storage area network devices, hard disk drives, solid-state devices, etc.). In addition, these computing resources may be used to support virtual networks, virtual machines, databases, applications, etc.

Cloud computing resources accessible via communication network 112 may include a private cloud, a public cloud, and/or a hybrid cloud. For example, a private cloud may be a cloud infrastructure operated by an enterprise for use by the enterprise, while a public cloud may refer to a cloud infrastructure that provides services and resources over a network for public use. In a hybrid cloud computing environment which uses a mix of on-premises, private cloud and third-party, public cloud services with orchestration between the two platforms, data and applications may move between private and public clouds for greater flexibility and more deployment options.

In accordance with an aspect of the present disclosure, computing server system 116 and devices 118 may be cloud-based and may comprise at least one of personal computers, servers, server farms, laptops, tablets, mobile devices, smart phones, cellular devices, media players, network enabled printers, routers, wireless access points, network appliances, storage systems, gateway devices, virtual or augmented reality devices, or any other suitable devices that are deployed in the same or different communication network of the optical distortion determination system 110. Computing server system 116 may be configured to provide functionalities for any connected devices such as storing information, sharing data or provisioning resources among multiple client devices, or performing computations for each connected client device.

Figure 3:
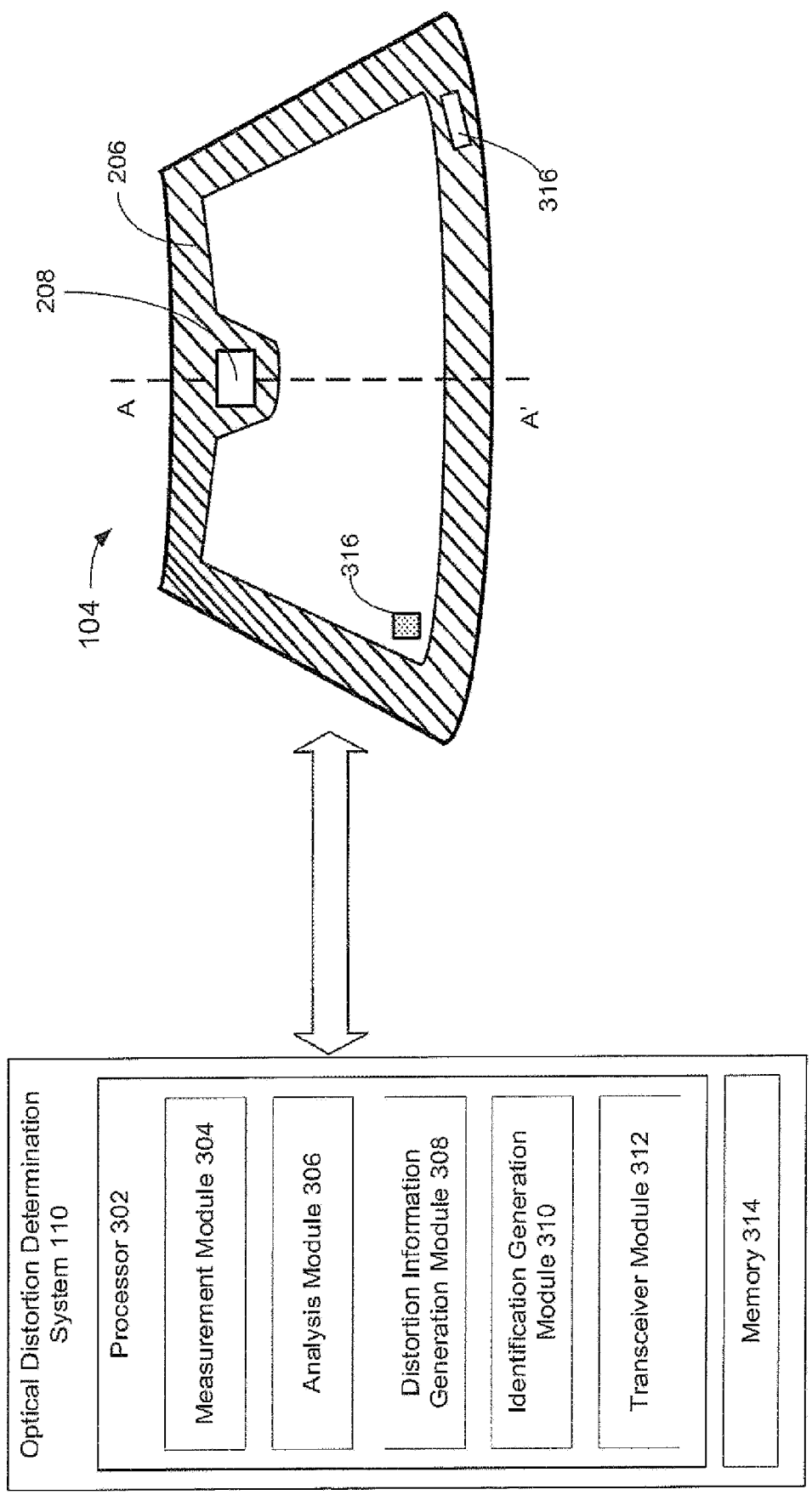
FIG. 3 illustrates a schematic diagram of an optical distortion determination system for correcting distortions in images obtained by an information acquisition system through a vehicle glazing, according to an exemplary aspect of the present disclosure.

Referring to FIG. 3, an optical distortion determination system 110 of system 100 may include at least one processor 302 configured to control and execute a plurality of modules including a measurement module 304, an analysis module 306, an optical distortion information generation module 308, an identification generation module 310, and a transceiver module 312. The term "component" and "module" as used herein means a real-world device, apparatus, or arrangement of components or modules implemented using an application specific integrated circuit (ASIC) or field-programmable gate array (FPGA), or as a combination of hardware and software, such as by a microprocessor system and a set of instructions to implement the component's or module's functionality, which (while being executed) transform the microprocessor system into a special-purpose device. A component or module may also be implemented as a combination of the two, with certain functions facilitated by hardware alone, and other functions facilitated by a combination of hardware and software. Each component or module may be realized in a variety of suitable configurations and should not be limited to any particular implementation exemplified herein.

Memory 314, which may be coupled to the processor 302, may be configured to store at least a portion of information obtained by optical distortion determination system 110. In one aspect, memory 314 may be a non-transitory machine readable medium configured to store at least one set of data structures or instructions (e.g., software) embodying or utilized by at least one of the techniques or functions described herein. It should be appreciated that the term "non-transitory machine readable medium" may include a single medium or multiple media (e.g., a centralized or distributed database, and/or associated caches) configured to store the at least one instruction. The term "machine readable medium" may include any medium that is capable of storing, encoding, or carrying instructions for execution by all modules of optical distortion determination system 110 and that cause these modules to perform at least one of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks.

In accordance with aspects of the present application, measurement module 304 may be configured by processor 302 of optical distortion determination system 110 to measure parameters and/or characteristics related to optical distortions 210 in a pre-defined location of the vehicle glazing 104 such as opaque print open area 208. In other embodiments, the pre-defined location may be a center area of the vehicle windshield 104 where head-up display information is projected. An example laminated vehicle glazing or windshield 104 may comprise at least two bent glasses laminated together by a polymer interlayer. The polymer interlayer may comprise any suitable material such as polyvinyl butyral (PVB). When the laminated glazing is used with a head-up display device, the polymer interlayer in some embodiments may be a PVB interlayer having a wedged angle.

Specifically, measurement module 304 may include a plurality of components and equipment configured to measure a number of parameters such as optical (angular) deviation and optical power (also referred to as dioptric power, refractive power, focusing power, or convergence power) of vehicle glazing 104.

Figure 4:
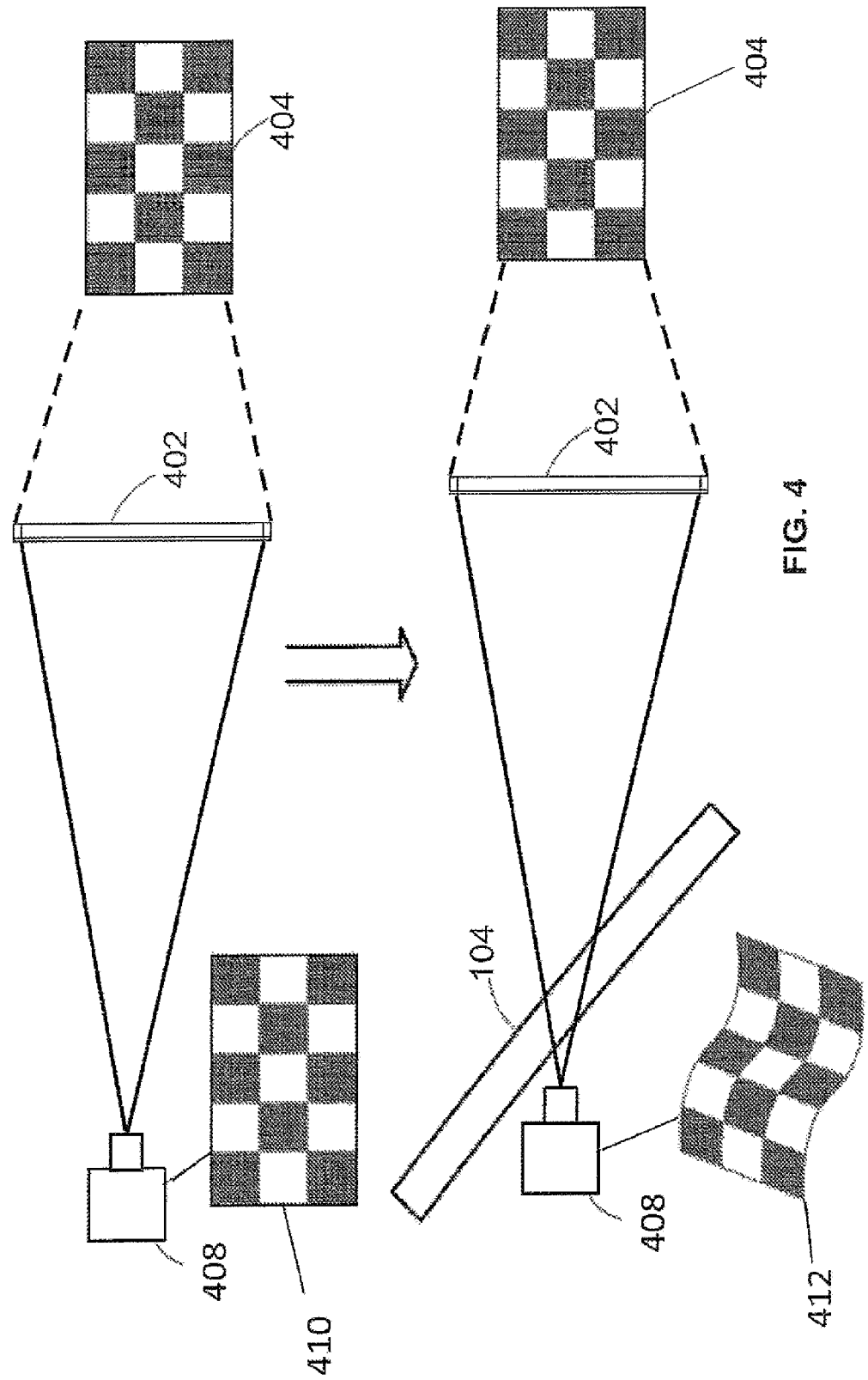
FIG. 4 illustrates an example system for measuring optical distortions of a vehicle glazing, according to an exemplary aspect of the present disclosure.

Referring to FIG. 4, as an initial set up, camera 408 may be equipped with a lens and an imager chip, and a display screen 402 placed at a distance within the focus of camera 408. The display screen 402 may include a calibration pattern 404 such as slanted lines or horizontal lines. The calibration pattern 404 may be formed on the display screen 402 permanently, projected onto the display screen 402, generated on the display screen 402, such as where the display screen 402 is an LCD monitor, for example, or otherwise provided on the display screen 402. An image 410 of calibration pattern 404 may be captured by camera 408. Next, vehicle glazing 104 may be inserted between the camera 408 and the display screen 402, the camera 408 may capture a second image 412 with the vehicle glazing 104 in front of the camera 408, and a change in the second image 412 may be compared to the image 410 created before vehicle glazing 104 is inserted to determine optical deviations created by the vehicle glazing 104. The display screen 402 has the same calibration pattern 404 displayed when the camera 408 captures each image 410, 412. The vehicle glazing 104 may be inserted with a pre-determined insert angle (i.e., pre-determined install angle to a vehicle body, such as 60.6 degree, for example). The change in the lateral displacement of the projected diagonal lines from similar lines shown on the screen 402 may be a measure of the angular deviation. The change in the width of the projected horizontal lines may be a measure of the optical power of the vehicle glazing 104, particularly in a vertical direction. Lines may be provided and measured in any desired direction to provide optical power of the vehicle glazing 104 in a direction normal to the lines measured. Optical power is the degree to which a lens, mirror, or other optical system converges or diverges light. It may be defined as an inverse of focal length of the convex/concave lens of the optical system being measured, typically presented in milli-diopter (mdpt), which may be positive or negative in value. High optical power corresponds to a short focal length. For two or more thin lenses positioned together, the optical power of the combined lenses is approximately equal to the sum of the optical powers of each lens. Similarly, the optical power of a single lens is approximately equal to the sum of the powers of each surface.

FIG. 4 illustrates example distortions that may occur when a vehicle glazing 104 is provided in front of a calibration pattern 404. The calibration pattern 404 may include any type of pattern suitable for performing spatial or chromatic calibration (e.g., a checkerboard pattern comprising a plurality of checkerboard squares, or a dot pattern comprising a plurality of open or closed circles). The calibration pattern 404 may include any type of test or calibration pattern such as a geometric pattern or a random stochastic pattern. The calibration pattern 404 may be captured by the camera 408 to provide image 412 after vehicle glazing 104 is inserted between the camera 408 and the display screen 402. Distortions present in such an image 412 may include spatial distortions (e.g., when a visible pixel is not where it is expected to be within the field of view) and chromatic distortions (e.g., when a color value of a visible pixel is different from what is expected). For example, the checkerboard squares of the pattern 404 may be shifted and/or distorted from their expected positions in the image 412 (e.g., spatial errors). In addition, instead of the checkerboard squares appearing in black and white, some checkerboard squares in the image 412 may appear in other colors, such as purple (e.g., chromatic errors).

It should be noted that camera 408 may be fully calibrated as a camera 202 would be positioned in a vehicle for tilt and displacement in order to ensure that distortions in images captured by camera 408 are due to vehicle glazing 104 rather than errors associated with the camera itself. For example, camera calibration comprises performing at least one of flat field correction (e.g., intensity response of the camera is uniform across its field of view (FOV)), lens distortion correction (e.g., identifying and compensating for lens distortion), or pixel scaling (e.g., identifying the relationship between the pixel size on the camera's image versus the pixel size of a source image).

Next, analysis module 306 may be configured by processor 302 of optical distortion determination system 110 to analyze at least one image captured by camera 408 to determine deviations between correct (physical) position of each position mark and its actual displayed position. In one aspect, at least a portion of the position marks may correspond to features in a calibration image (e.g., centers and corners of calibration checkerboard squares). Distortion information generation module 308 may be configured to generate a warpage map or vector field $(\Delta x, \Delta y)(x, y)$ based on the analysis results of module 306. Each vector in the vector field may represent distortion effects caused by both the lens of camera 408 and vehicle glazing 104. Knowing the effect of the camera lens, a warpage map solely related to vehicle glazing 104 may be calculated by distortion information generation module 308.

Using the warpage map of vehicle glazing 104, local or global distortion information may be additionally determined by module 308. For example, an optical distortion map may be generated based at least upon the warpage map. The optical distortion map may be used to analyze a distribution of pixel position error values (e.g., vector magnitude) over the generated vector field. The optical distortion map may be a histogram showing the frequency of pixel position errors (e.g., plotting a pixel position error magnitude against frequency at which the error magnitude appears in the vector field). The optical distortion map may be used to analyze other attributes of the vector field (e.g., distortion direction).

In some embodiments, an optical distortion map may be presented as a contour optical power distribution map (measured in milli-diopter, mdpt) of transmitted optics in a predetermined area(s) of a vehicle glazing 104. In certain embodiments, optical power of horizontal optical distortion in the vehicle glazing 104 may be measured. The optical power distribution map may be determined, without limitations, by using ISRA Labscan-Screen 2D inspection equipment, with an optical filter setting parameter 3/2/0, corresponding to a physical length of 2 mm and masking filter setting 6/5/5/R_, corresponding to a physical masking length of approximately 9 mm around opaque black printing, at a predetermined installation angle of the vehicle glazing 104. The masking may be preferably applied as the inspection algorithm shows mathematical artefacts when calculating the optical power values close to non-transparent areas. These artefacts are not a physical nature of the glass and may be hidden by the mask so that they are not confused with the optical power of the glass. Further, the optical power distribution map may be measured without a calibration pattern 404 when two line measurement cameras are used.

In accordance with other aspects of the present disclosure, optical distortion determination system 110 may be configured to calculate a modulation transfer function (MTF) of vehicle glazing 104 using any suitable methods such as ISO 15529:2010, "Optics and photonics—Optical transfer function—Principles of measurement of modulation transfer function (MTF) of sampled imaging system", incorporated by reference herein. MTF is a measure of the ability of an optical system to transfer various levels of detail from an object to an image (i.e., sharpness of the optical system). The amount of detail in an image may be defined by a resolution of the optical system, and specified in line pairs per millimeter (lp/mm). A line pair includes one cycle of a light bar and dark bar of equal width and has a contrast of unity. MTF is a plot of contrast, measured in percent, against spatial frequency measured in lp/mm. MTF may be normalized to a value of 1 at zero spatial frequency (all white or black). Applications which rely upon image integrity or resolution may utilize MTF as a measure of performance at a critical dimension, such as a line width or pixel resolution or retinal sensor spacing. MTF is analogous to electrical frequency response, and allows for modeling of optical systems using linear system theory. For example, optical systems including multiple stages (i.e., lenses, film, human eye) may have a system MTF equal to the product of the MTF of the individual stages, allowing the overall optical system performance to be gauged by subsystem characterization.

In one embodiment, measurement, analysis, and distortion information generation modules 304, 306, 308 may use a slanted-edge method for measuring the MTF of vehicle glazing 104. In one embodiment, the optical resolution across a series of images of a slanted edge target captured by camera 408 in a mounted position with and without vehicle glazing 104 inserted in front of the camera 408 may be analyzed. An example slanted edge target may include a titled checkboard in the background and five low contrast slanted edges together with surrounding gray patches in the front. These images may be acquired across a range of slanted edge angles, contrast and noise levels (e.g., at 5 different positions in the edges and the center) within the field of view of camera 408. Optical resolution of these images may be used by analysis and distortion information generation modules 306, 308 for calculating the MTF of vehicle glazing 104.

Further, distortion information generation module 308 may be configured to transform (e.g., filter, prune, re-format, aggregate, summarize, or compress) digitized distortion information of vehicle glazing 104 into a format suitable for storage and/or further analysis on a cloud platform. Module 308 may modify at least a portion of the digitized distortion information of vehicle glazing 104 based on an explicit or inferred requirement of a cloud computing device, or user-defined transform profiles instructing how various categories of raw data are to be transformed prior to being pushed to the cloud, and/or contextual metadata that provides context for the raw data.

For example, module 308 may include one or more of a formatting component, a context component, an encryption component, a filter component, an aggregation component, and a compression component (not shown). A formatting component may be configured to convert any specified subset of the digitized distortion information of vehicle glazing 104 from a first format to a second format in accordance with a requirement of a cloud-based device or system 116, 118, thereby normalizing the digitized distortion information for collective analysis with data obtained from other disparate data sources. For example, a cloud-based vehicle information acquisition calibration system may require measured optical distortion data in a particular common format so that dependencies and correlations between different data sets from disparate industrial sources may be identified and analyzed. Accordingly, formatting component of module 308 may convert a selected subset of the digitized distortion information of vehicle glazing 104 from a native format to a required common format prior to uploading the digitized distortion information to the cloud-based system 100. Alternatively, the digitized distortion information of vehicle glazing 104 may be reformatted by computing systems 116, 118 using various cloud computing resources.

A context component of module 308 may associate contextual metadata with raw data obtained by measurement module 304 such as a time/date stamp, a quality value, a location associated with the data (e.g., a geographical location), machine statuses at the time the data was generated, or other such contextual information, which may be used by cloud-based systems 116, 118 in connection with cloud-side analysis.

Furthermore, module 308 may include an encryption component configured to encrypt sensitive or proprietary information contained in the digitized distortion information of vehicle glazing 104 prior to uploading to computing server system 116. An aggregation component of module 308 may be configured to combine related data from multiple sources. For example, data obtained from multiple sensors of measurement module 304 may be identified and aggregated into a single cloud upload packet by the aggregation component. A compression component of module 308 may compress data to be uploaded to the cloud using any suitable data compression algorithm. This may include detection and deletion of redundant data bits, truncation of precision bits, or other suitable compression operations.

In accordance with some aspects of the present disclosure, optical distortion determination system 110 may include an identification generation module 310 configured by processor 302 to generate identification information 316 for data related to each vehicle glazing 104. For example, at least one unique machine-readable code may be generated for each vehicle glazing 104 and associate with the digitized optical distortion information of vehicle glazing 104. Example machine-readable codes may include at least one of a combination of numbers and/or letters, barcode, quick response (QR) code, passive or active radio frequency identification (RFID) tag, near field communication (NFC) tracker, Bluetooth low energy (BLE) beacon, and/or global system for mobile communication/short message service (GSM/SMS) tag. As shown in FIG. 3, the identification information 316 may be provided in the opaque print area 206 or at least one main viewing surface of the vehicle glazing. The identification information 316 may be created by any suitable printing (e.g., a screen printing or laser printing), by any suitable etching methods (e.g., sandblasting or laser etching). In some embodiments, the identification information 316 may be a sticker on an outer or inner surface of vehicle glazing 104.

A transceiver module 312 may be configured by processor 302 of optical distortion determination system 110 to communicate various information and data with other computing systems and devices. For example, transceiver module 312 may transmit digitized optical distortion information of vehicle glazing 104 and its identification information 316 to cloud-based computing server system 116 via communication network 112 for storage or further analysis.

In accordance with aspects of the present disclosure, computing server system 116 may comprise multiple databases configured to perform various data storage operations including content indexing, data deduplication, policy-driven data storage, data retrieval, data classification, data mining or searching, data encryption and compression, and data migrating within a cloud environment. The digitized optical distortion information of vehicle glazing 104 may be accessed and downloaded from anywhere and anytime by another computing system 118 deployed within, e.g., the cloud environment. For example, the identification information 316 may be scanned by a computing device 118 of an end user for determining the most suitable/compatible camera system from many camera systems available in the market to be installed in the vehicle 108 together with the vehicle glazing 104. For another example, when laminated vehicle glazing 104 (e.g., windshield) is assembled into a vehicle body together with an information acquisition system 106 (e.g., camera 202 of FIG. 2), the identification information 316 may be scanned by a standalone device or a device associated with the computing device 118 serving as a calibration device/system. The information acquisition system 106 itself may have a calibration function. Subsequently, a search query may be generated by the scanning device and transmitted to computing server system 116 for searching the content index of its databases. Example scanners may comprise a pen-type scanner, a laser scanner, a charge-coupled device (CCD) scanner, a camera-based scanner, a video camera reader, a large field-of-view reader, or an omnidirectional barcode scanner. As a result, digitized optical distortion information of vehicle glazing 104 matching the identification information 316 may be accessed and downloaded from computing server system 116. In one embodiment, such information may be used to calibrate camera 202. In another embodiment, computing device 118 may evaluate optical quality information of vehicle glazing 104 based on the downloaded digitized optical distortion information for determining and selecting the suitable or compatible camera system to be installed in the vehicle 108, such that optical distortions in the images captured by such camera system are minimized or eliminated.

Each individual information acquisition system 106 may be calibrated and corrected based on the digitized optical distortion information of vehicle glazing 104 that is assembled into a vehicle body. Calibration and analysis method may depend on mechanism of each specific information acquisition system 106, and also depend on digitized optical distortion information of vehicle glazing 104. Any suitable calibration and analysis method, which at least can process the digitized optical distortion information, may be used to calibrate the information acquisition system and correct distorted images. For example, a dewarping process may be performed by shifting camera image coordinates and interpolation of sub-pixels of each image. Dewarping refers to the process of correcting an image to reverse the effects of geometric distortions caused by the camera lens found in fisheye or 360° devices. It is known that a camera with a wide-angle lens may have a magnitude of a viewing angle (horizontal or vertical) up to about 180 degrees. When a camera captures an image through a wide-angle lens, such as in a fish-eye lens camera, the image is often round or distorted. Therefore, such image may be converted into a flat image through a dewarping process. For example without limitation, a non-patent literature, Aaron Bauer et al, Optics Express. Vol. 20, No. 14, pp. 14906-20, "Computational optical distortion correction using a radial basis function-based mapping method", incorporated by reference herein, generally discloses image dewarping methods.

As a result of a dewarping process performed based on the digitized optical distortion information of vehicle glazing 104, each information acquisition system 106 of an assembled vehicle may obtain corrected undistorted information.

Moreover, the downloaded digitized optical distortion information of vehicle glazing 104 may be used to provide information to an end user including a vehicle repairperson or vehicle manufacturer) to understand the optical quality of the vehicle glazing 104 when selecting a vehicle camera system. Further, computing server system 116 may include one or more databases for storing digitized optical distortion information of various vehicle glazing products and/or glass products.

In one embodiment, computing server system 116 may include a plurality of components configured to maintain (e.g., update, filter, prune, re-format, aggregate, summarize, or compress) uploaded digitized distortion information of a glass product (e.g., vehicle glazing 104) into a format suitable for storage and/or further analysis on a cloud platform. For example, computing server system 116 may be configured to receive updated information or date related to the optical quality of the glass product from various data sources on the cloud-platform. Upon receiving a request to retrieve modify digitized distortion information of a glass product from a connected cloud device, computing server system 116 may modify at least a portion of the stored digitized distortion information based on an explicit or inferred requirement of requesting device, or user-defined transform profiles instructing how various categories of raw data are to be transformed, and/or contextual metadata that provides context for the raw data.

For example, computing server system 116 may include one or more of a formatting component, a context component, an encryption component, a filter component, an aggregation component, and a compression component (not shown). Formatting component may be configured to convert any specified subset of stored digitized distortion information of a glass product from a first format to a second format, thereby normalizing the digitized distortion information for collective analysis with data obtained from other disparate data sources. For example, a computing device of an end user may require measured optical distortion data of a glass product in a particular common format so that dependencies and correlations between different data sets from disparate industrial sources may be identified and analyzed. Accordingly, formatting component of computing server system 116 may convert a selected subset of the digitized distortion information of a glass product from a native format to a required common format prior to transmitting to the end user. Alternatively, the digitized distortion information may be reformatted by computing server system 116 using various cloud computing resources.

A context component of computing server system 116 may associate contextual metadata with stored digitized distortion information such as a time/date stamp, a quality value, a location associated with the data (e.g., a geographical location), machine statuses at the time the data was generated, information related to any update or modification of the stored information, or other such contextual information, which may be used by cloud-based systems 116, 118 in connection with cloud-side analysis.

Furthermore, computing server system 116 may include an encryption component configured to encrypt sensitive or proprietary information contained in all stored digitized distortion information prior to transmitting to other cloud-based devices. An aggregation component of computing server system 116 may be configured to combine related data from multiple sources. For example, computing server system 116 may obtain, aggregate and update data reflecting any modification of stored digitized distortion information of a glass product from reliable data source. A compression component of computing server system 116 may compress data in connection with a selected data structure using any suitable data compression algorithm. This may include detection and deletion of redundant data bits, truncation of precision bits, or other suitable compression operations.

Optical distortion information of various glass products stored by computing server system 116 may serve as a data source for audits. For example, in case of exceptions or accidents (e.g., in autonomous driving vehicles), the information may be a valuable source for documenting party liability in compensation claims.

Figure 5:
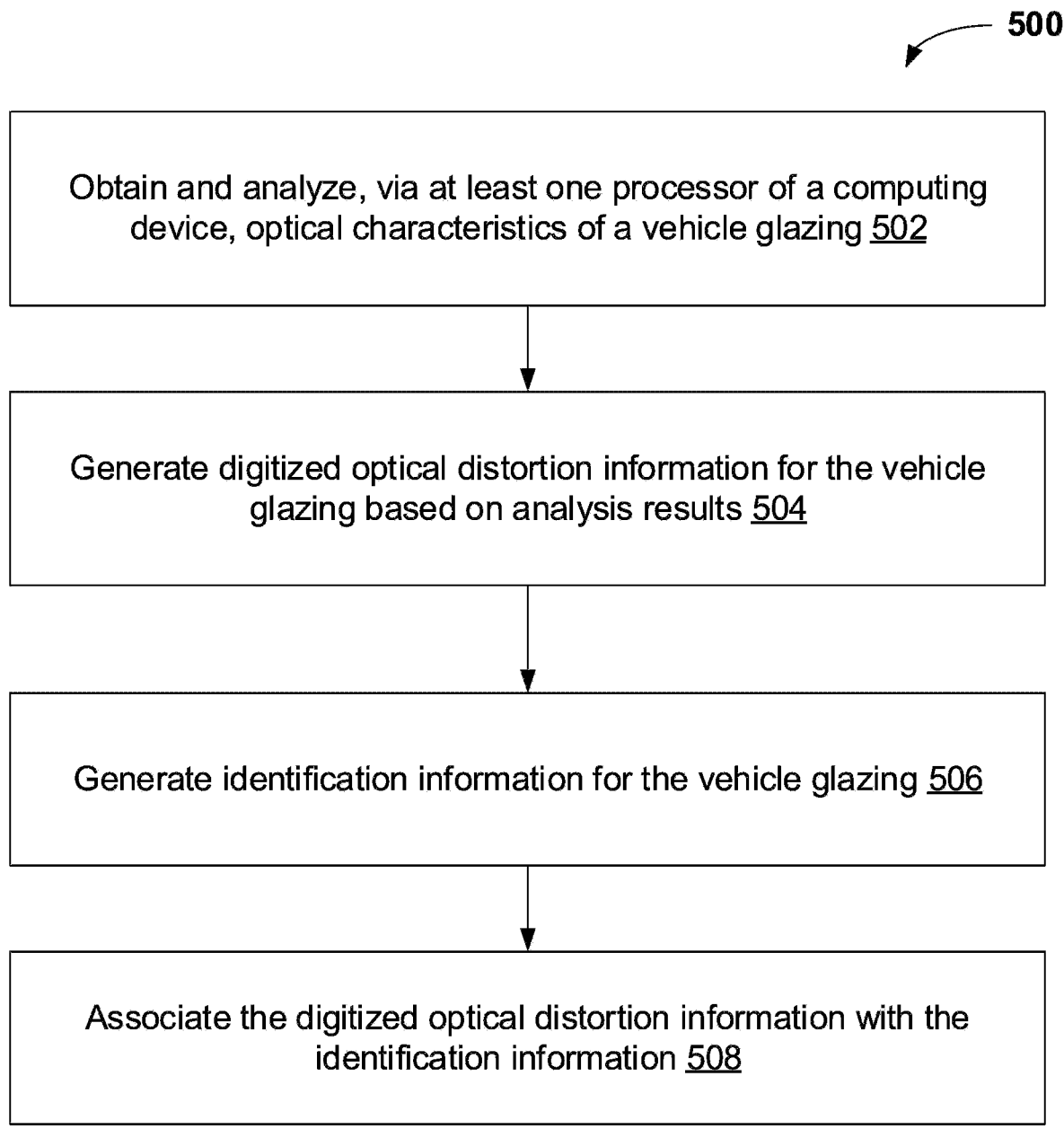
FIG. 5 illustrates an example method, according to an exemplary aspect of the present disclosure.

Referring to FIG. 5, according to aspects of the present disclosure, a flow chart of a method 500 is illustrated. Method 500 may be carried out to provide optical distortion information of a vehicle glazing or correct distortions in images obtained by an information acquisition system through a vehicle glazing. Method 500 may comprise obtaining and analyzing (502), via at least one processor of a computing device (e.g., optical distortion determination system 110 of FIG. 1), optical characteristics of the vehicle glazing, and generating (504) digitized optical distortion information for the vehicle glazing based on the analysis results. Method 500 may further comprise generating (506) identification information for the vehicle glazing, and associating (508) the digitized optical distortion information with the identification information. In some embodiments, the identification information may be generated prior to obtaining and analyzing optical characteristics of the vehicle glazing and the digitized optical distortion may be associated with the identification information previously provided on the vehicle glazing. The digitized optical distortion information and the identification information may be transmitted to at least one computing system via a communication network. In one embodiment, the at least one computing system may be a cloud-based computing server system configured to store the digitized optical distortion information and the identification information of the vehicle glazing.

The digitized optical distortion information of the vehicle glazing may comprise data related to the optical characteristics of the vehicle glazing, a warpage map of the vehicle glazing, or data related to a MTF of vehicle glazing. The identification information of the vehicle glazing may comprise at least one unique machine-readable code including at least one of a combination of numbers and/or letters, barcode, QR code, passive or active RFID tag, NFC tracker, BLE beacon, and GSM/SMS tag. In one embodiment, the digitized optical distortion information of the vehicle glazing may be downloaded from the cloud-based computing server system using the identification information and used to determine and select an information acquisition system to be mounted near the vehicle glazing and acquire information through the vehicle glazing. Alternatively, the digitized optical distortion information may be used to calibrate an information acquisition system mounted near the vehicle glazing and acquire information through the vehicle glazing.

Figure 6:
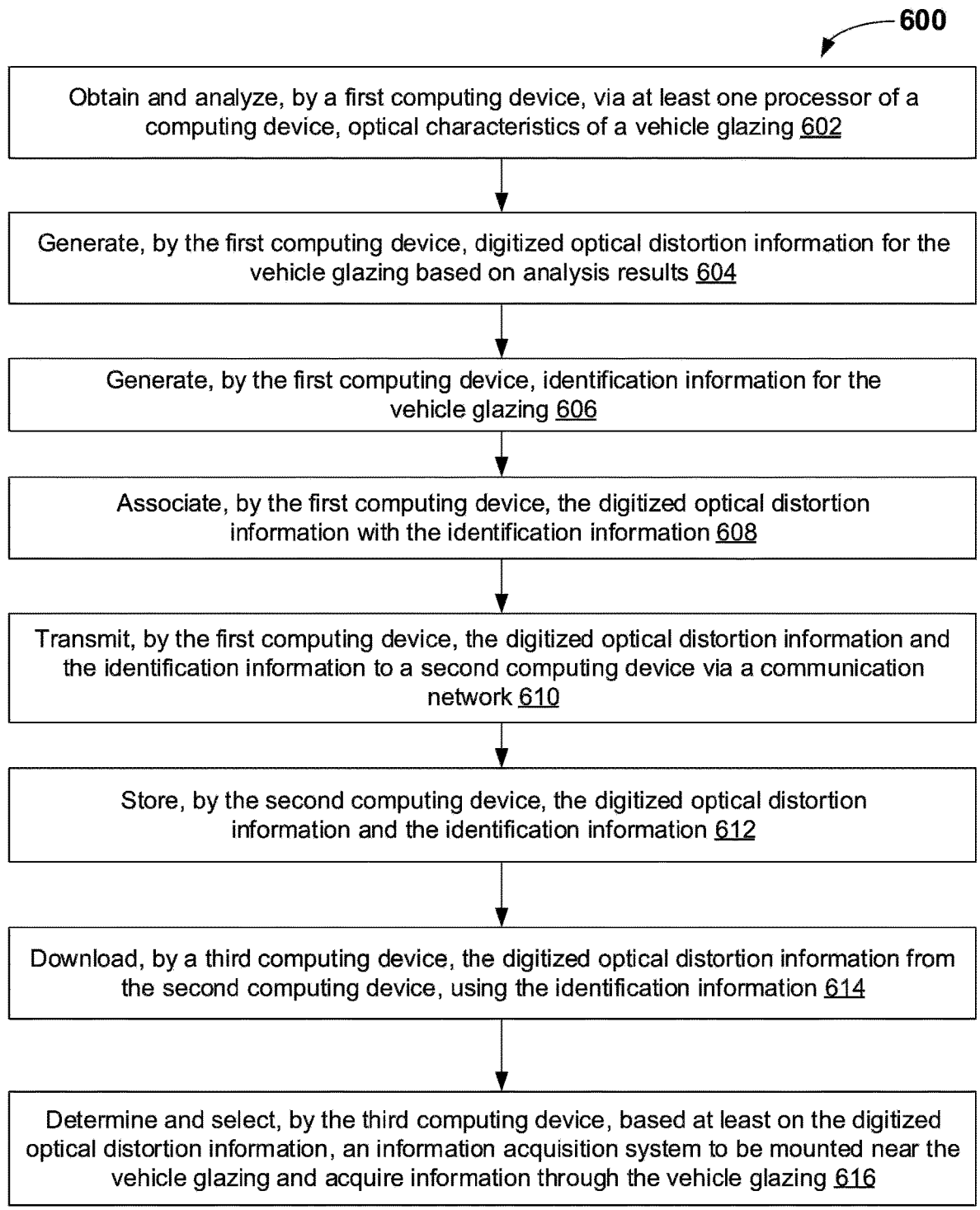
FIG. 6 illustrates an example method for providing optical distortion information of a vehicle glazing, according to an exemplary aspect of the present disclosure.

Referring to FIG. 6, according to aspects of the present disclosure, a flow chart of a method 600 for providing optical distortion information of a vehicle glazing is illustrated. Method 600 may comprise obtaining and analyzing (602), by a first computing device (e.g., optical distortion determination system 110 of FIG. 1), optical characteristics of the vehicle glazing, and generating (604), by the first computing device, digitized optical distortion information for the vehicle glazing based on the analysis results. Method 600 may further comprise generating (606), by the first computing device, identification information for the vehicle glazing, associating (608), by the first computing device, the digitized optical distortion information with the identification information, and transmitting (610), by the first computing device, the digitized optical distortion information and the identification information to a second computing device (e.g., computer server system 116 of FIG. 1) via a communication network (e.g., communication network 112 of FIG. 1). In some embodiments, the identification information may be generated prior to obtaining and analyzing optical characteristics of the vehicle glazing and the digitized optical distortion may be associated with the identification information previously provided on the vehicle glazing. Alternatively, the digitized optical distortion information and the identification information of the vehicle glazing may be stored on any suitable data storage device or system.

In addition, method 600 may comprise storing (612), by the second computing device, the digitized optical distortion information and the identification information, downloading (614), by a third computing device (e.g., computing system or device 118 of FIG. 1), the digitized optical distortion information from the second computing device, using the identification information, and determining and selecting (616), by the third computing device, based at least on the digitized optical distortion information, an information acquisition system to be mounted near the vehicle glazing and acquire information through the vehicle glazing.

Figure 7:
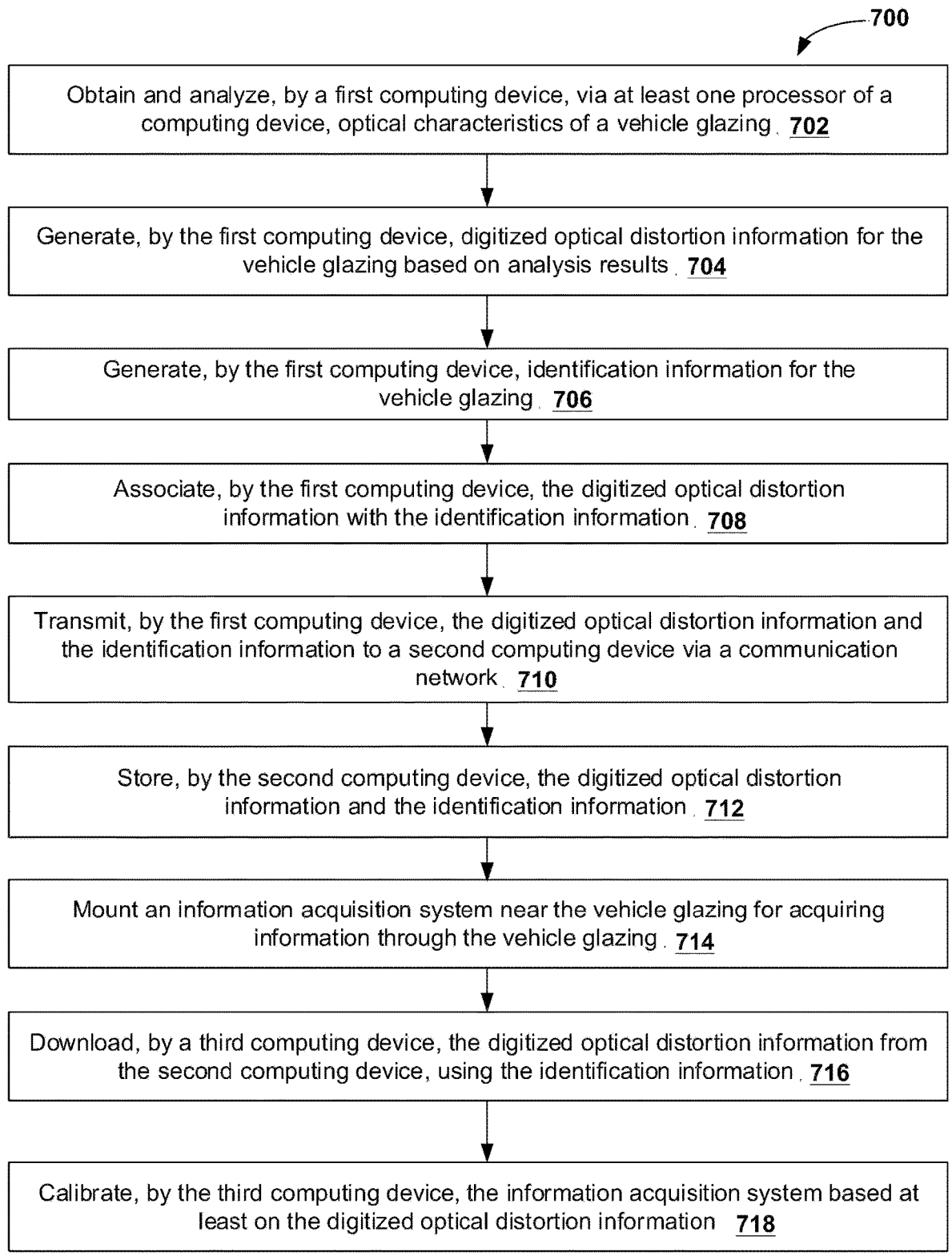
FIG. 7 illustrates an example method for correcting image distortion obtained by an information acquisition system through a vehicle glazing, according to an exemplary aspect of the present disclosure.

Referring to FIG. 7, according to aspects of the present disclosure, a flow chart of a method 700 for correcting distortions in images obtained by an information acquisition system through a vehicle glazing is illustrated. Method 700 may comprise obtaining and analyzing (702), by a first computing device (e.g., optical distortion determination system 110 of FIG. 1), optical characteristics of the vehicle glazing, and generating (704), by the first computing device, digitized optical distortion information for the vehicle glazing based on the analysis results. Method 700 may further comprise generating (706), by the first computing device, identification information for the vehicle glazing, associating (708), by the first computing device, the digitized optical distortion information with the identification information, and transmitting (710), by the first computing device, the digitized optical distortion information and the identification information to a second computing device (e.g., computer server system 116 of FIG. 1) via a communication network (e.g., communication network 112 of FIG. 1). In some embodiments, the identification information may be generated prior to obtaining and analyzing optical characteristics of the vehicle glazing, and the digitized optical distortion may be associated with the identification information previously provided on the vehicle glazing. Alternatively, the digitized optical distortion information and the identification information of the vehicle glazing may be stored on any suitable data storage device or system.

In addition, method 700 may comprise storing (712), by the second computing device, the digitized optical distortion information and the identification information, mounting (714) an information acquisition system near the vehicle glazing for acquiring information through the vehicle glazing, downloading (716), by a third computing device (e.g., computing system or device 118 of FIG. 1), the digitized optical distortion information from the second computing device, using the identification information, and calibrating (718), by the third computing device, the information acquisition system based at least on the digitized optical distortion information.

Figure 8:
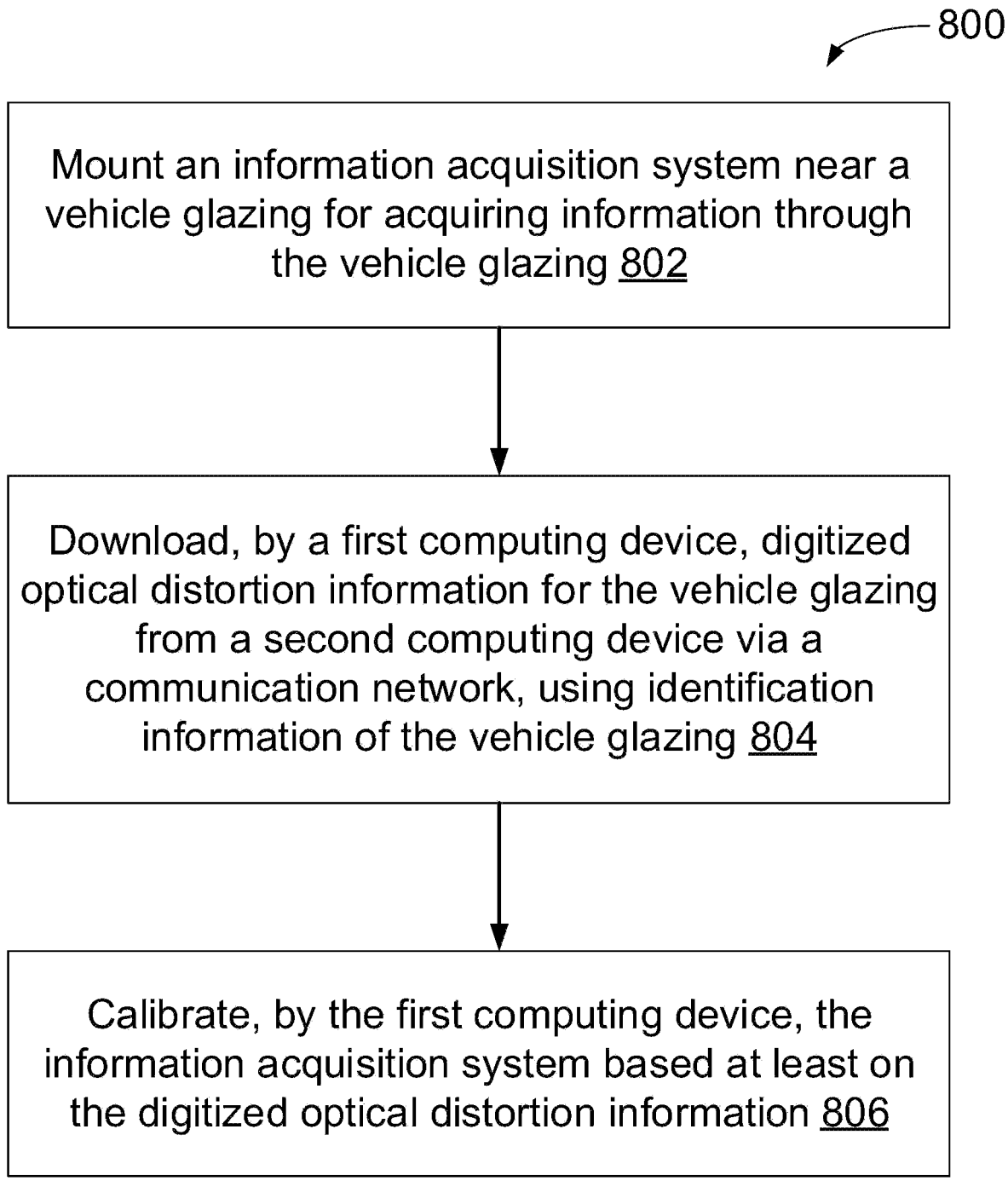
FIG. 8 illustrates an example method for calibrating an information acquisition system, according to an exemplary aspect of the present disclosure.

Referring to FIG. 8, according to aspects of the present disclosure, a flow chart of a method 800 for calibrating an information acquisition system is illustrated. Method 800 may comprise mounting (802) an information acquisition system near a vehicle glazing for acquiring information through the vehicle glazing. Method 800 may also comprise downloading (804), by a first computing device, digitized optical distortion information for the vehicle glazing from a second computing device via a communication network, using identification information of the vehicle glazing. In one embodiment, the identification information of the vehicle glazing includes at least one unique machine-readable code that is associated with the digitized optical distortion information. Method 800 may also comprise calibrating (806), by the first computing device, the information acquisition system based at least on the digitized optical distortion information.

Figure 9:
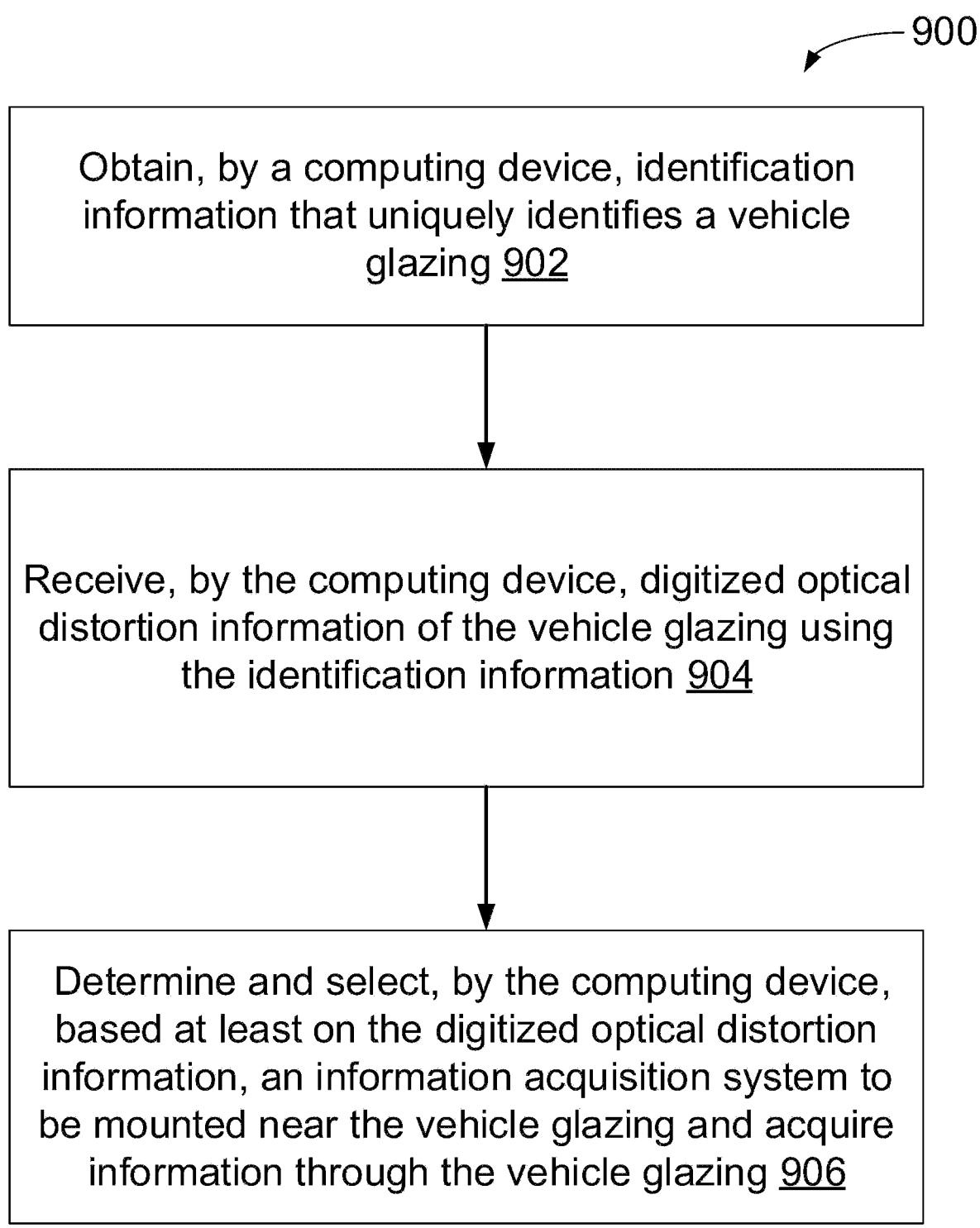
FIG. 9 illustrates an example method for determining and selecting an information acquisition system to be installed in a vehicle, according to an exemplary aspect of the present disclosure.

Referring to FIG. 9, according to aspects of the present disclosure, a flow chart of a method 900 for determining and selecting an information acquisition system to be installed in a vehicle is illustrated. Method 900 may comprise obtaining (902), by a computing device, identification information that uniquely identifies a vehicle glazing; receiving (904), by the computing device, digitized optical distortion information of the vehicle glazing using the identification information; and determining and selecting (906), by the computing device, based at least on the digitized optical distortion information, an information acquisition system to be mounted near the vehicle glazing and acquire information through the vehicle glazing.

The above description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Further, the above description in connection with the drawings describes examples and does not represent the only examples that may be implemented or that are within the scope of the disclosure or the claims.

Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

The invention claimed is:

1. A method for providing optical distortion information of a vehicle glazing, the method comprising:
    obtaining and analyzing, via at least one processor of a computing device, optical characteristics of the vehicle glazing;
    generating digitized optical distortion information for the vehicle glazing based on analysis results;
    generating identification information for the vehicle glazing;
    associating the digitized optical distortion information with the identification information; and
    determining and selecting, by another computing device, based at least upon the digitized optical distortion information, an information acquisition system to be mounted near the vehicle glazing and acquire information through the vehicle glazing.

2. The method of claim 1, further comprising transmitting the digitized optical distortion information and the identification information to at least one computing system via a communication network.

3. The method of claim 2, wherein the at least one computing system comprises a cloud-based computing server system, the method further comprises storing, by the cloud-based computing server system, the digitized optical distortion information and the identification information.

4. The method of claim 3, further comprising downloading, by another computing device, the digitized optical distortion information of the vehicle glazing from the cloud-based computing server system using the identification information.

5. The method of claim 1, wherein the digitized optical distortion information for the vehicle glazing comprises at least data related to the optical characteristics of the vehicle glazing, a warpage map of the vehicle glazing, or data related to a modulation transfer function (MTF) of the vehicle glazing.

6. The method of claim 1, wherein the identification information of the vehicle glazing comprises at least one unique machine-readable code including at least one of a combination of numbers and/or letters, barcode, quick response (QR) code, passive or active radio frequency identification (RFID) tag, near field communication (NFC) tracker, Bluetooth low energy (BLE) beacon, and global system for mobile communication/short message service (GSM/SMS) tag.

7. A method for providing optical distortion information of a vehicle glazing, the method comprising:
    obtaining and analyzing, via at least one processor of a computing device, optical characteristics of the vehicle glazing;
    generating digitized optical distortion information for the vehicle glazing based on analysis results;
    generating identification information for the vehicle glazing;
    associating the digitized optical distortion information with the identification information; and
    calibrating, by another computing device, an information acquisition system mounted near the vehicle glazing and acquire information through the vehicle glazing based at least upon the digitized optical distortion information.

8. A method for providing optical distortion information of a vehicle glazing, the method comprising:
obtaining and analyzing, via at least one processor of a first computing device, optical characteristics of the vehicle glazing;
generating, by the at least one processor of the first computing device, digitized optical distortion information for the vehicle glazing based on analysis results;
generating, by the at least one processor of the first computing device, identification information for the vehicle glazing;
associating, by the at least one processor of the first computing device, the digitized optical distortion information with the identification information;
transmitting, by the first computing device, the digitized optical distortion information and the identification information to a second computing device via a communication network;
storing, by the second computing device, the digitized optical distortion information and the identification information;
downloading, by a third computing device, the digitized optical distortion information from the second computing device, using the identification information; and
determining and selecting, by the third computing device, based at least on the digitized optical distortion information, an information acquisition system to be mounted near the vehicle glazing and acquire information through the vehicle glazing.

9. A method for providing optical distortion information of a vehicle glazing, the method comprising:
obtaining and analyzing, via at least one processor of a first computing device, optical characteristics of the vehicle glazing;
generating, by the at least one processor of the first computing device, digitized optical distortion information for the vehicle glazing based on analysis results;
generating, by the at least one processor of the first computing device, identification information for the vehicle glazing;
associating, by the at least one processor of the first computing device, the digitized optical distortion information with the identification information;
transmitting, by the first computing device, the digitized optical distortion information and the identification information to a second computing device via a communication network;
storing, by the second computing device, the digitized optical distortion information and the identification information;
mounting an information acquisition system near the vehicle glazing for acquiring information through the vehicle glazing;
downloading, by a third computing device, the digitized optical distortion information from the second computing device, using the identification information; and
calibrating, by the third computing device, the information acquisition system based at least on the digitized optical distortion information.

10. A system for providing optical distortion information of a vehicle glazing, the system comprising:
an optical distortion determination system comprising at least one processor configured to: obtain and analyze optical characteristics of the vehicle glazing, generate digitized optical distortion information for the vehicle glazing based on analysis results, generate identification information for the vehicle glazing, associate the digitized optical distortion information with the identification information, and transmit the digitized optical distortion information and the identification information to at least one computing system via a communication network, wherein the at least one computing system is configured to store the digitized optical distortion information and the identification information;
an information acquisition system that is mounted near the vehicle glazing to acquire information through the vehicle glazing; and
a computing device that is configured to: download the digitized optical distortion information from the at least one computing system using the identification information and calibrate the information acquisition system based at least on the digitized optical distortion information.

11. The system of claim 10, wherein the digitized optical distortion information for the vehicle glazing comprises at least data related to the optical characteristics of the vehicle glazing, a warpage map of the vehicle glazing, or data related to a modulation transfer function (MTF) of the vehicle glazing.

12. The system of claim 10, wherein the identification information of the vehicle glazing comprises at least one unique machine-readable code including at least one of a combination of numbers and/or letters, barcode, quick response (QR) code, passive or active radio frequency identification (RFID) tag, near field communication (NFC) tracker, Bluetooth low energy (BLE) beacon, and global system for mobile communication/short message service (GSM/SMS) tag.

13. The system of claim 10, wherein the at least one computing system comprises a cloud-based computing server system.

14. The system of claim 13, wherein the computing device is configured to download the digitized optical distortion information of the vehicle glazing from the cloud-based computing server system using the identification information.

* * * * *